United States Patent [19]
Martin

[11] Patent Number: 5,618,232
[45] Date of Patent: Apr. 8, 1997

[54] DUAL MODE GAMING DEVICE METHODS AND SYSTEMS

[76] Inventor: John R. Martin, 5635 Nebeshonee La., Rockford, Ill. 61103

[21] Appl. No.: 409,273

[22] Filed: Mar. 23, 1995

[51] Int. Cl.$^6$ .................................................. A63F 9/24
[52] U.S. Cl. ........................... 463/25; 463/29; 463/40
[58] Field of Search ............................ 273/138 A, 433, 273/434, 148 B, DIG. 28; 364/410; 345/173; 463/16, 1, 23, 25, 29, 40, 47

[56] References Cited

U.S. PATENT DOCUMENTS

| | | | |
|---|---|---|---|
| 3,865,368 | 2/1975 | Grazebrook | 273/138 A |
| 5,266,931 | 11/1993 | Tanaka | 345/173 |
| 5,327,160 | 7/1994 | Asher | 345/173 |
| 5,468,001 | 11/1995 | Hermo | 273/434 |

FOREIGN PATENT DOCUMENTS

| | | | |
|---|---|---|---|
| 2020986 | 1/1993 | Australia | 273/138 A |
| 2216322 | 2/1989 | United Kingdom | 273/138 A |

OTHER PUBLICATIONS

Documents and screen dumps from Angeband 2.5 PC version 1.40 shareware game available on the ieternet (Marsh, Cutler, and Hill—version.hlp, origcmgs.hlp, whts.new, and screen dumps from angband.exe) Date Mar. 1994.
McComb, "Playing the new adult–rated computer games", Popular Science, Jul. 1984, pp. 92–96, 98 Date Jul. 1984.

*Primary Examiner*—Jessica Harrison
*Attorney, Agent, or Firm*—Snell & Wilmer

[57] ABSTRACT

An electronic game device system is switchable between an amusement mode and a gaming or gambling mode and is useful for vehicles such as airplanes or boats which move geographically from jurisdictions where gaming is legal to jurisdictions where it is not. A GPS receiver can be used to automatically switch the system between the modes, dependent upon the vehicle position. An improved method of operating a touch screen on a CRT or LCD computer screen uses finger release as input registering, and also may use highlighting of a button being selected with an enlarged button area for any highlighted button. Mounting arrangements for mounting computer screens or monitors are also disclosed for mounting between a transparent table top in e.g. a lounge area, and for mounting in seatbacks of airplane or other vehicle seats.

13 Claims, 6 Drawing Sheets

DUAL MODE GAMING DEVICE METHODS AND SYSTEMS

BACKGROUND OF THE INVENTION

This invention relates to amusement or gaming device methods and systems. Electronic gaming machines are generally known, and may take the form of slot machines, poker machines, blackjack machines, roulette machines, etc. The electronic machine takes the place of the dealer for games of the type that involve a dealer, and the player, after inputting money or tokens representing the wager or drawing an amount to be wagered from a credit balance associated with the player in the machine, inputs card selection and/or other gaming decision inputs by pushing buttons provided on the machine or in some instances by placing a finger on a box displayed on a CRT or LCD touch screen.

Electronic amusement machines are also known, and are often provided in restaurants or lounges in non-gaming jurisdictions or environments for patron amusement. Patrons typically insert coins into the machines for the privilege of playing on the machines, and scoring of the game is done by the machine. Typically, player input into the amusement game is achieved by pressing buttons or a touch screen in the same manner as discussed above for gaming devices, but without of course the wagering step.

In the prior art, electronic machines have been provided as amusement devices or as gaming machines, but usually not both. Rather, the electronic machines have been used for a dedicated single purpose, i.e., either amusement or gaming but not both.

OBJECTS AND SUMMARY OF THE INVENTION

It is an object of the present invention to provide a method and system incorporating a dual mode gaming device which is selectably configurable as a gaming device on the one hand, or as an electronic amusement game device on the other hand.

It is another object of the present invention to provide a dual mode gaming device as described above, in which switching between the gaming and amusement modes is achieved automatically, based on geographic position or coordinates information.

It is another object of the present invention to provide an electronic machine and method used solely for amusement purposes, and in which scoring can be arbitrarily increased by a player to prevent the electronic amusement machine from being considered or used as a gambling machine.

It is another object of the present invention to provide novel mounting arrangements for electronic gaming/amusement machines for incorporation into vehicles that traverse jurisdictional boundaries, such as boats, airplanes, buses and/or trains.

It is another object of the present invention to provide an improved touch screen control system for input of selection information into a computer system, which can be a gaming/amusement device in accordance with other aspects of the present invention but which need not be.

Briefly, in accordance with one embodiment of the invention, there is provided a system and method in which electronic game machines are switchable between an amusement mode and a gaming mode. Player input means are provided which can be in the form of knobs, buttons or touch screen areas on a CRT or LCD screen. In the amusement mode, the game machines include circuitry which keeps score of a game, with the score simply being a number or other indicia of relative success in playing the game. In the gaming mode, either a system controller or the electronic game machines themselves have registers for maintaining an indication of player credit balance, and for incrementing or decrementing the player credit balance in accordance with the outcome of games played by the player in the gaming mode.

In accordance with various embodiments of the present invention, the switching of a machine between amusement and gaming modes can be done by the player, by the system operator such as by the crew of a boat or airplane on which the machines are provided, or can be done automatically by the system in accordance with geographic coordinates or the like.

In accordance with additional other aspects of the present invention, a touch screen is provided for player input, and an improved control system is provided for the touch screen system for minimizing errors and missed inputs.

In accordance with still further aspects of the present invention, improved mounting arrangements are provided for gaming device screens incorporating player input for deployment in land based applications or on vehicles such as boats and airplanes, in which the gaming device screens are incorporated in other structures for efficiency and convenience.

Other objects, advantages and features of the various aspects of the present invention will appear from a consideration of the drawings provided together with the detailed description of certain embodiments, as well as of course the appended claims.

DETAILED DESCRIPTION

Figure 1:
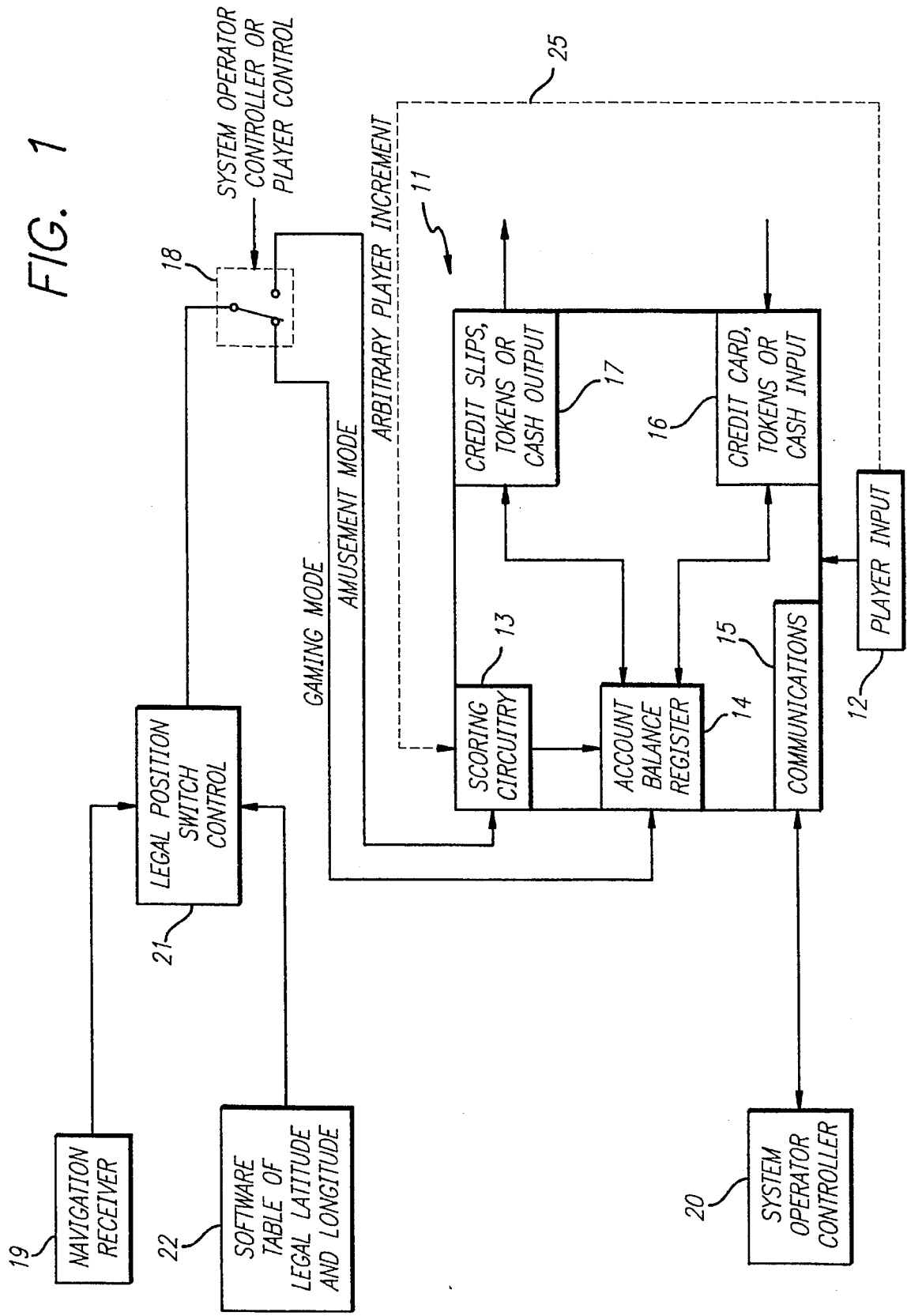
FIG. 1 is a block diagram of one embodiment of a dual mode amusement/gaming device system in accordance with the present invention.

Turning now to a consideration of the drawing figures, FIG. 1 is a block diagram of one embodiment of a dual mode amusement/gaming device system in accordance with one aspect of the present invention. There are many jurisdictions where gaming is legal, and many jurisdictions where gaming is not legal. Vehicles or passenger conveyances such as boats, airplanes, buses and trains, are capable of and do carry passengers in various jurisdictions and from one geographic position in one jurisdiction to another geographic position in another jurisdiction, including some where gaming or gambling is legal and some where it is not. For example, in the case of a boat or ocean going vessel, it is a common situation that certain segments of a voyage may take place in geographic areas or jurisdictions where gambling is not legal (such as within a three-mile or nine mile coastal limit of the United States) and other parts of the voyage may take place in geographic areas or jurisdictions where gambling or gaming is legal, i.e. on the high seas. In accordance with one aspect of the present invention, the system operator of a gaming or amusement machine is able to ensure that the machine is not viewed as a gambling machine by the authorities in jurisdictions where gambling is illegal, by providing a mechanism for preventing the machine from being operated in a gaming or gambling mode while in such jurisdictions. Thus, in accordance with this aspect of the invention the operating mode of a machine may be switched between a gaming (or gambling) mode in which wagers are placed by a player, payoffs are made, etc., and an amusement mode, in which no gambling can occur and instead an electronic machine only provides a score to a player to provide feedback to the player on how well he or she is playing the game. In accordance with the broadest aspects of the invention, a machine can be switched between gaming and amusement modes by the player, by the operator of the system or vessel on which the system is provided, such as a ship's crew, or even automatically switched in accordance with the vessel's geographic location as provided by positioning determining means such as a global satellite positioning system (GPS) or a Loran system.

Turning to a detailed consideration of FIG. 1, a gaming machine generally indicated by reference numeral 11 is provided. The gaming machine can be any of a wide variety of types, such as poker machines, blackjack machines, roulette machines, etc. Such gaming device machines are well known in the art and the particular game provided on the machine is not important to an understanding of the present invention. Such known machines involve mechanisms for receiving player input during game play, with the player input being diagrammatically indicated in FIG. 1 by box 12.

Player input to an electronic amusement or gaming machine can be provided through buttons or switches provided on the machine as known in the art, but in accordance with the preferred embodiment of the invention is provided through touching button or box areas provided on a CRT or LCD screen, also in a manner well known in the computer and game art. Use of a touch screen facilitates player interaction, and there are no buttons or switches to become fouled due to spilling drinks, etc., which is of course a concern given the environment in which most electronic amusement and gaming machines are located.

The machine 11 is provided with the usual scoring circuitry illustrated by box 13, which can function while the machine is either in a gaming mode or an amusement mode. The scoring circuitry or software is of course dependent on the particular game or games provided on the machine, and appropriate circuitry or software for the various games is well known.

An account balance register indicated by box 14 is provided for use in connection with the operation of the machine or device in the gaming or gambling mode, and the account balance register 14 is suitably interconnected with the scoring circuitry 13 to increment or decrement the account balance when the machine is in a gaming mode in accordance with the success or lack of success of the player. Suitable account balance circuitry or software arrangements are also known in the art, with electronic machines used for gaming in casinos and the like providing a "credit balance" indication or talley. The account balance register can be incorporated into each machine, or can alternatively or additionally be incorporated into the system operator controller 20 for providing an account balance for each player at a central location.

Naturally a mechanism or arrangement needs to be provided for accepting wagers from the player. Box 16 is intended to refer to a suitable arrangement for accepting wagers or player selected increases to an account balance for operation of the machine 11 in a gaming mode. Box 16 can be any suitable arrangement for accepting credit cards, where a credit card is debited in accordance with a preselected amount by the player. Alternatively, tokens which can be purchased by the player can be input into arrangement 16 for wagering or increasing the account balance register 14 as well as cash. The input of cash, tokens or credit card debit can be with regard to one wager on one game to be played, or as a general increase to a player's account balance from which individual wagers are later debited or subtracted by the player. Also, of course, funds for wagering can be accepted at the control location system controller 20, where the funds are translated into an account balance.

Conversely, when a player has concluded a gaming or gambling session and desires to "cash out," a suitable mechanism or arrangement is provided for the machine settling up with the player. Box 17 is intended to refer to such an arrangement. Box 17 can be any suitable arrangement for crediting a credit card account or the like with whatever is in the account balance register 14 at the time a player "cashes out." Alternatively, tokens can be output to the player which can be redeemed at a cashier or the like for cash, or arrangement 17 can be provided to simply output cash in accordance with the account balance register 14 when the player cashes out. Suitable arrangements are well known for causing a credit in a credit card account as well as for outputting tokens or cash in accordance with a credit balance when a player "cashes out." As shown in FIG. 1, the account balance register is interconnected with both of the boxes 16 and 17 for registering inputs of credit cards, tokens or cash, and for controlling payouts of the machine in credit card credits, tokens or cash. Also, of course, in installations where a player's account balance is maintained at a central location in the system controller 20, such "cashing out" can take place at the central location rather than at an individual machine.

As mentioned at the outset, in accordance with this one aspect of the invention, the device or machine 11 is selectably switchable between a gaming mode in which game play results not only in scoring kept track of by traditional scoring circuitry 13, but also incrementing or decrementing the account balance register 14 of the player in accordance with the player's success or lack thereof in the game play. In the amusement mode, the scoring circuitry 13 functions to indicate the success or lack of success of the player in playing the game, but no gaming or gambling occurs because game play does not result in any incrementing or decrementing of the account balance register 14.

In FIG. 1 a switching means 18 is provided for switching the machine or device 11 between gaming mode and amusement mode functions. The switching device 18 can obviously be manually operated, either by a player or by the system operator of the machines 11, such as a ship's crew in the case of an ocean going vessel.

FIG. 1 also illustrates an alternative arrangement in which switching between gaming mode and amusement mode automatically occurs when the vehicle or vessel on which the gaming device or machine 11 is located transitions from geographic positions or jurisdictions where gaming is legal to jurisdictions where gaming is illegal and vice versa. In accordance with this alternative embodiment shown in FIG. 1, a navigation receiver 19 is provided. Navigation receivers, such as GPS and Loran receivers, are well known in the art, and can provide very accurate geographic position indications over most if not all of the earth. Loran navigation receivers have been in use for a long time on airplanes and boats, and are known to be very accurate position determining means at least in areas adequately served by Loran transmission chains. As is also well known, GPS receivers are quite accurate in determining positioning fixes for civilian applications over most of the earth (even when subject to selective degradation by military authorities), particularly if the GPS systems are provided with differential position circuitry. GPS systems with differential correction facility can be used to accurately locate a geographic position on the earth to within 10 or 15 feet or less.

The navigation receiver 19 provides a geographic position output signal to a legal position switch control 21, with the geographic position output signal representing the position of the vehicle or vessel (e.g. in terms of latitude and longitude) on which the gaming/amusement devices 11 are located. A software table or the like indicated by box 22 is provided which is preprogrammed with latitudes and longitudes where gaming is illegal (e.g., within three miles or in some instances nine miles of a shoreline), and latitudes and longitudes where gaming is permitted (i.e., outside the coastal limit). The legal position switch control 21 compares the geographic position as reported by the navigation receiver 19 to the software table or the like of legal latitude and longitude geographic positions provided by box 22, and uses the result of the comparison to determine whether or not the switching means 18 is switched to the position allowing the gaming mode of operation or whether it is switched and restricted to the amusement mode of operation.

The machine 11 is shown in FIG. 1 as including a communications component 15 interconnected with a system operator controller 20. This facilitates two-way communication between a system operator or display, as might be required for certain gaming functions or activities. Also, where game device 11 is situated on a vessel or conveyance, such as in a lounge, for example, the communications capability can be useful in the player ordering drinks, food, or merchandise. Thus, in a manner known in the art, the machine 11 can be provided with an ordering mode, with menus of selectable items provided by an on line or residently stored catalog, with appropriate player input through a touch screen or the like for placing orders. Payment for the orders can be automated by credit card, token or cash input by the player into arrangement 16, or payment can be achieved through a debit to the player's account balance register 14, maintained either locally at a machine or at the system controller.

There is some concern on the part of governmental authorities that even in geographic areas where gaming is not permitted, that so-called "amusement" machines used in lounges and the like, are in fact used for illegal gambling. In reality, any electronic game machine which provides a score, whether measured in dollars, points, or whatever, can be used for gambling, so long as there is a way for the operator or owner of the machine to "clear" or wipe out a score. That is, the operator or owner of the electronic machine either receives the wagers or the wagers result from money input into the machine and winning wagers are paid off in accordance with the "amusement" score indicated on the machine, instead of the machine itself making payoffs. Although this kind of arrangement is in fact, illegal, there seems to be no question but that it occurs. This has resulted in consideration by some governmental authorities of banning altogether "amusement" machines in which a score is provided, and is capable of being cleared or "wiped out.".

In accordance with one aspect of the present invention, a means can be provided to ensure that an "amusement" machine, whether a dedicated amusement machine or a switchable machine being operated in amusement mode, cannot be used for gambling. In FIG. 1, there is shown a dashed line labeled with reference numeral 25, extending from the player input means 12 to scoring circuitry 13. This refers to an arbitrary player increment to the scoring circuitry, which can be activated at any time the machine is in amusement mode (or anytime with a dedicated "amusement" machine) to increment the score. That is, at any time during play of an amusement game, the player is permitted to arbitrarily increase the score indicated by the machine, i.e. by 100 points, 100 dollars, or whatever. With such an arrangement there is no practical way that the machine could be used for illegal gambling, subject as the score is to being arbitrarily increased at any time by the player.

Moreover, as mentioned above, this feature of the present invention is equally applicable to machines operating in a dedicated fashion in "amusement" applications, as well as the switchable machine shown in FIG. 1 being operated in amusement mode.

As mentioned previously, the preferred mode of providing player input to a gaming device or machine in accordance with the present invention is through use of a touch screen provided on a CRT or LCD screen. In accordance with another aspect of the present invention, an improved arrangement is provided for minimizing errors and ambiguities which can arise in connection with the operation of touch screens. Although the improved arrangement and method of this aspect of the invention can be and preferably is applied to touch screens provided on CRT or LCD screens of gaming/amusement machines in accordance with other aspects of this invention, this aspect of the present invention is not limited to such applications. Rather, the touch screen aspects of this invention can be applied to any CRT or LCD screen of any computer based system to provide input by a person to the system.

Touch screens are very popular as a user interface not only with respect to gaming or amusement devices, but by airline and rental car reservation terminals and other computer applications for use by players or customers who may not be totally computer literate to issue commands to computers by pressing on images (or buttons) provided on the screen. The screens are usually CRTs, but could appropriately be LCDs or any other type of computer screens, the basic technology for which is well known. Current touch screen applications require that large button areas (i.e., "touch" areas) be provided on the screens as well as a relatively large spacing between buttons due to the inherent ambiguities of the touch point and the release point reported to a processor by the touched screen. The ambiguities arise because known touch screens typically report essentially the centroid of the fingerprint area. This area is quite small at the moment of contact of a finger with the screen, and its exact location is not accurately predictable by the average user of the touch screen. Since, for the usual touch screen buttons, a command will not be issued unless the point of first touch of the finger to the screen and the point of release of the finger from the screen occur within the bounds of the same button on the screen, buttons must accordingly be large and well spaced to give the user a reasonable chance of issuing the desired command without jabbing at the screen a number of times or issuing the wrong command.

In accordance with one aspect of the present invention, a software controlled method and system is provided which issues commands based solely on the finger release point. Furthermore, once the screen is touched, the software responds by highlighting each button "slid over" by the finger and ultimately issues commands when the touch is released over a button which was slid onto. This allows the user to correct for a misaligned initial touch by sliding his or her finger while being visually guided, through feedback from the highlighting of the buttons.

Figure 2:
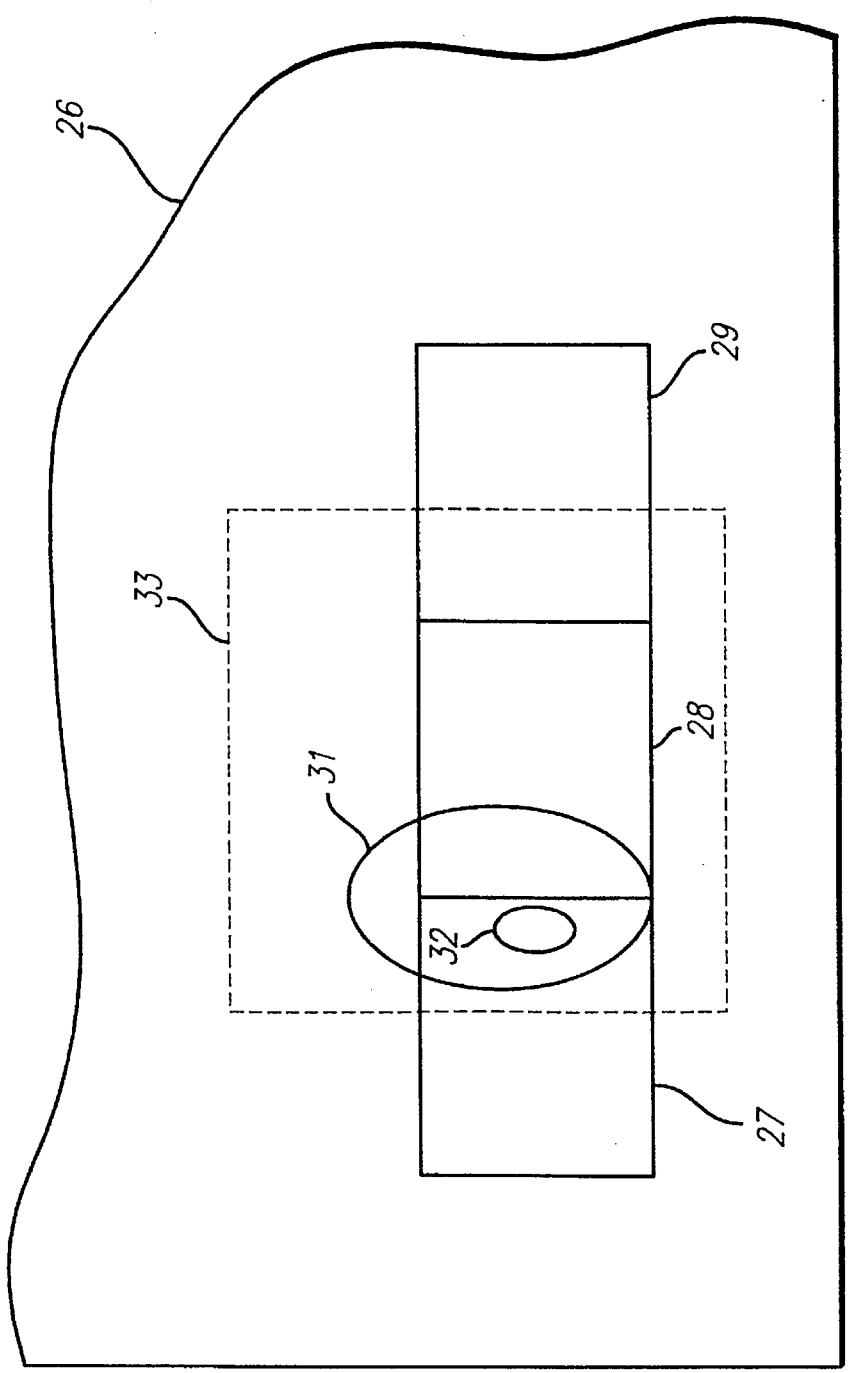
FIG. 2 is a diagram for explaining the improvement in touch screen input control systems in accordance with an aspect of the present invention.

FIG. 2 is a diagram which illustrates the basic operation of the touch screen aspect of the method and system of the present invention. A touch screen 26 is provided, such as on a CRT or LCD screen as is known. In FIG. 2, reference numerals 27, 28 and 29 are used to refer to screen buttons. The oval area 31 refers to a full touch fingerprint, and the smaller oval 32 refers to the centroid of the fingerprint as the finger is being lifted. The larger dotted rectangle 33 represents the enlarged sensitive area in accordance with this aspect of the present invention of the middle button 28. In accordance with the present invention this enlarged area is considered "sensitive" because the finger last contacted the screen within this button 28. The method and system of the present invention would report the release in the center button 28 because of the "hysteresis" rectangle 33 even though the actual point of release is over the left button as illustrated by the oval 32. In order to invoke the left button 27, the user must slide his or her finger off the center button 28 far enough to be clear of the dotted rectangle 33. This would be confirmed in operation by the unhighlighting of the center button 28 and the highlighting of the left button 27 on the touch screen. At this time, the sensitive area for the center button 28 would shrink and the sensitive area for the left button 27 would be enlarged in a similar fashion to the "hysteresis" area or dotted rectangle 33, but this time centered over the left button 27. When the user then releases his or her touch anywhere in the enlarged sensitive rectangle of the left button, the left button is invoked.

Figure 3:
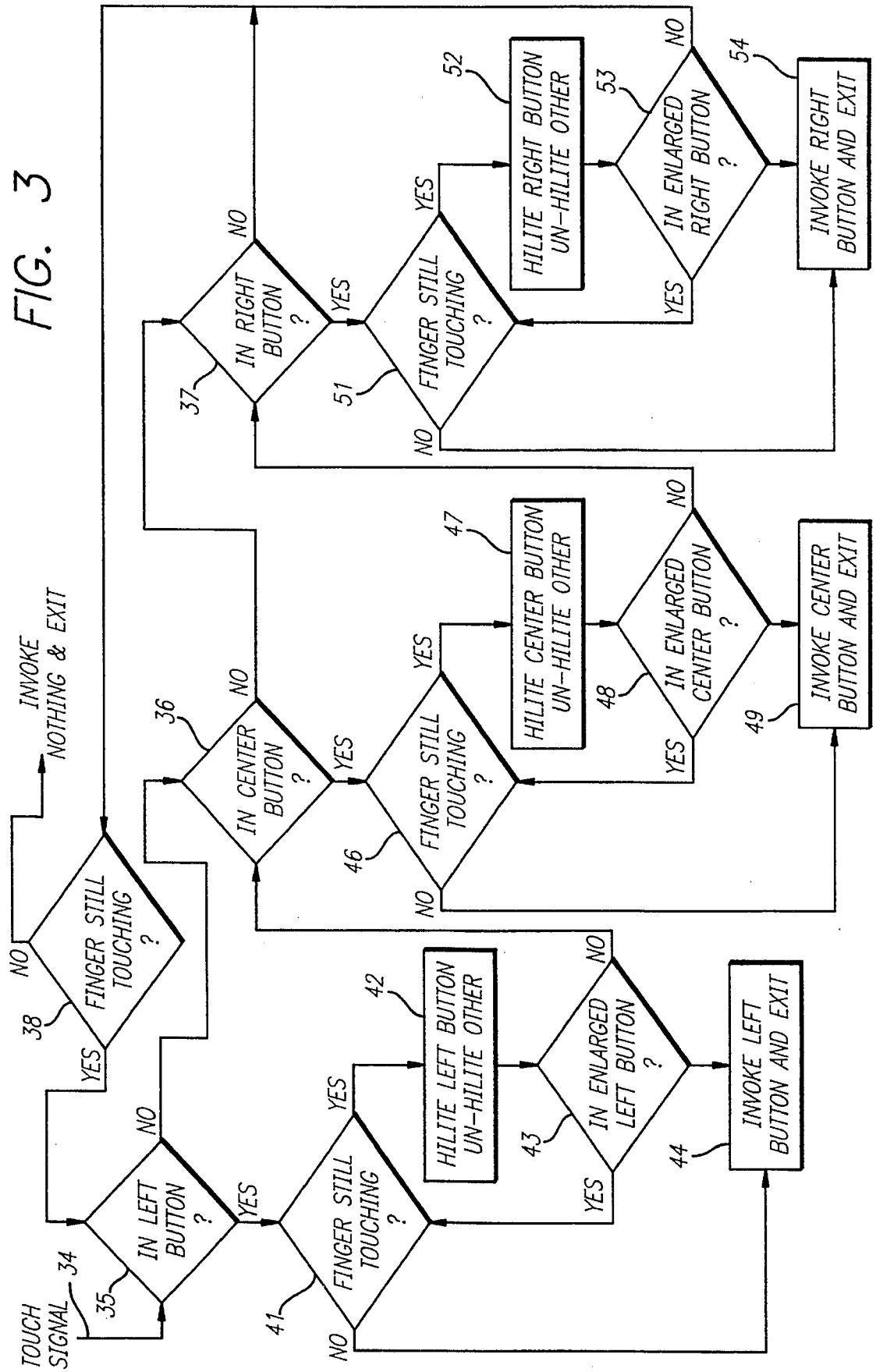
FIG. 3 is a flow chart of the software for controlling touch screen input in accordance with that aspect of the present invention.

Turning now to FIG. 3, there is shown a flow chart for the software for controlling operation of a touch screen in accordance with the method and system of this aspect of the present invention. Thus, a touch signal input 34 results in a comparison in decision block 35 as to whether or not the touch signal is in the left button. If not, then the comparison proceeds in decision block 36 as to whether the touch signal is in the center button and, if not, decision 37 decides whether or not the touch signal is in the right button. Similar decision block steps suitably occur for each of the various buttons which may be provided on a touch screen. The same type of comparison or evaluation keeps being conducted if it is determined that the touch signal is not in the right button through decision block 38 which recycles the method back to the left button, center button, right button, etc. If the finger is not still touching, nothing is invoked and the method exits the routine. If the finger is still touching anywhere on the touch screen, the same sort of comparison continues as to whether the touch signal is in the left button, center button, right button, etc.

Assume, for example, that the evaluation as to whether the touch signals in the left button which occurs in decision block 35 results in a yes output. Decision block 41 does an evaluation of whether or not the finger is still touching. If yes, decision block 42 highlights the left button and unhighlights any other buttons. Then, an evaluation is made in decision block 43 as to whether or not the finger touching is in the enlarged left button. This is the "hysteresis" function referred to above and which is illustrated in FIG. 2 by the dotted area 33. If the finger is still touching in the enlarged left button, looping occurs back to decision block 41. If the finger is not still touching as determined by the decision block 41, decision block 44 results in invoking the left button and exiting the routine. If decision block 43 determines that the finger is not touching in the enlarged left button, then the routine cycles to decision block 36 for the center button. Decision blocks 46 through 49 associated with the functions related to the center button function in the same way as decision blocks 41 through 44 function with regard to the left button. If decision block 48 determines that the finger is still touching, but not in the enlarged center button, then cycling of the routine proceeds to decision block 37 to determine whether or not the finger touching is in the right button. Decision blocks 51 through 54 associated with functioning of the right button probably function in the same way as decision blocks 46 through 49 associated with the center button and decision blocks 41 through 44 associated with the left button. Of course, equivalent software decision blocks are provided for each of the many touch screen buttons or selections provided in accordance with different screen displays on the machine.

The arrangement illustrated in FIGS. 2 and 3 results in improved functioning for any kind of touch screen, using both the slide-on feature and the hysteresis feature of the present invention. Such a touch screen is, of course, very efficient in connection with use in gaming devices or machines as well as amusement devices or machines, as well as machines in accordance with the present invention switchable between amusement and gaming modes. The touch screen method and system of the present invention, however, is not limited to gaming or amusement devices, but is applicable to any kind of environment and apparatus in which a touch screen is used with respect to a CRT or LCD or any other type of touch screen for player or operator input or selection.

It is known to provide "drop-in" gaming or amusement devices, typically mounted in bars or in tables in lounge areas. Such equipment, which is basically a computer, is subject to a fair amount of abuse due to drinks being spilled, things being dropped, etc. on the computer screen. In accordance with another aspect of the present invention, a method and arrangement are provided for fixing a computer display device, such as an LCD panel which would be relatively thin, or such other more or less flat panel type of displays, under a transparent surface, such as a table top, so that the display can be viewed through the transparent surface, but the transparent table top is still intact and usable for any other table functions, such as holding food and drink, etc.

Figure 4:
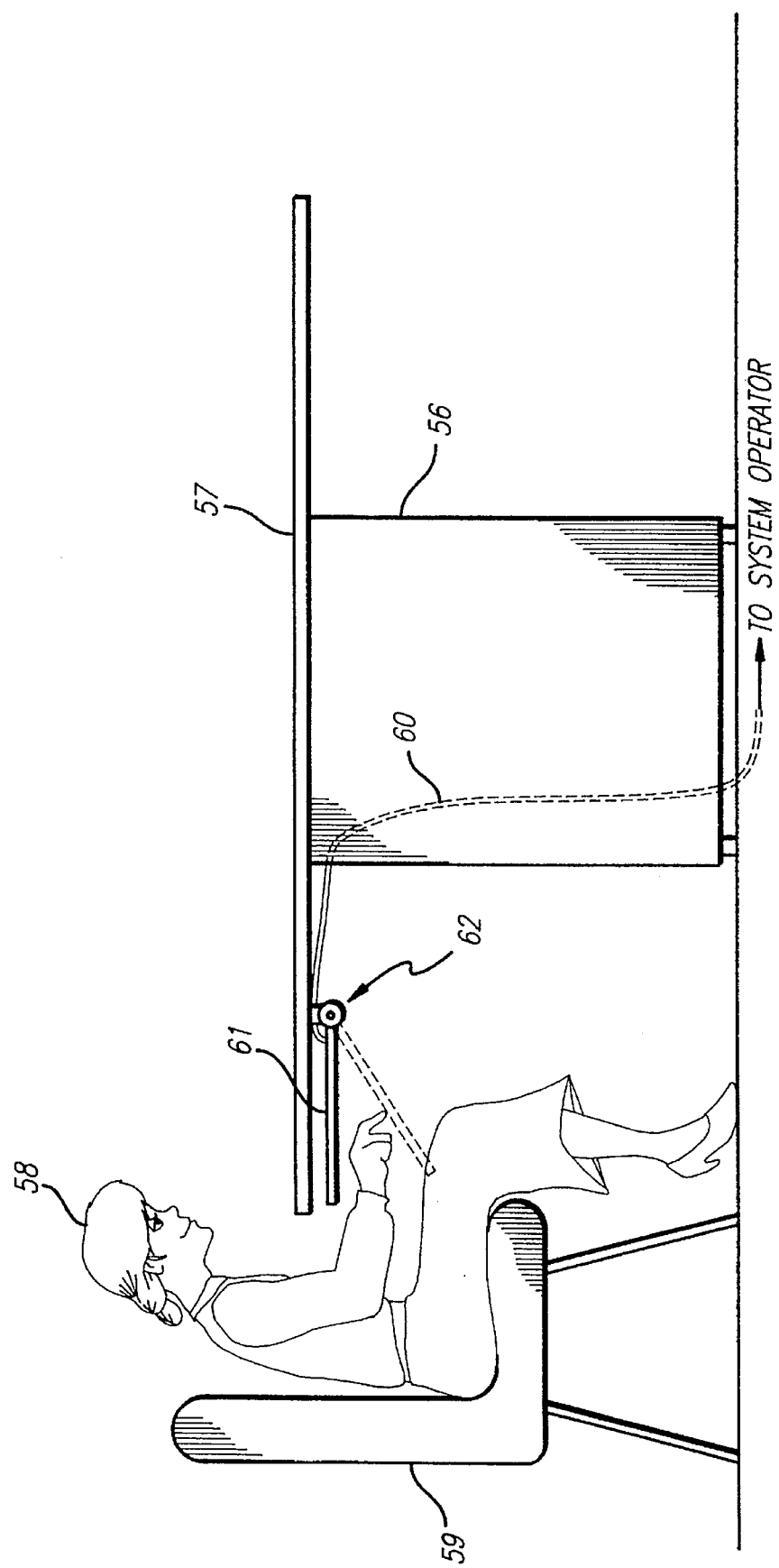
FIG. 4 is a side elevation of a mounting arrangement for a computer or game machine touch screen to a lounge table or the like in accordance with one aspect of the present invention.

Referring to FIG. 4, there is illustrated a table base 56 supporting a transparent table top 57 which can be transparent glass or plastic. A player or customer illustrated by reference numeral 58 is illustrated as being seated in a chair 59 at the edge of tabletop 57. A computer display and input device 61 is advantageously mounted through mounting means 62 to the underside of tabletop 57. The dotted lines shown in FIG. 4 illustrate the computer display device 61 as being rotatable to a viewing or playing position underneath tabletop 57. The computer display device 61 can have a computer or gaming device input arrangement such as a touch screen, with the player 58 being able to provide inputs to the device through touching appropriate buttons on the touch screen while viewing same through the transparent surface of tabletop 57.

If desired, the computer display and input device 61 can also incorporate an identification device, such as a magnetic stripe reader for credit cards, through an appropriate card reader arrangement as already referred to in connection with FIG. 1. Through use of such an arrangement, passengers on an oceangoing vessel, for an example, can order food and drink, purchase items from menus or catalogs provided on the computer display device 61, as well as gamble at their tables, without impairing the normal use of the tabletop. Suitable communication connection between the computer display device 61 and a central location, such as a system operator, can be made through appropriate wiring 60 run through the table base or the like. At the same time, the computer equipment is protected from spills and mechanical abuse. Such an arrangement as shown in FIG. 4 is also useful in lounge areas on a boat for an example, as it gets double duty from the limited floor space available on a boat. That is, a tabletop is provided which can be used to serve food and drink, while at the same time being functional, if desired by a patron or a player, for placing orders for food or drink or merchandise, as well as utilizing an amusement device or for gaming play if the ship is located in an area where gaming is legal.

Figure 5:
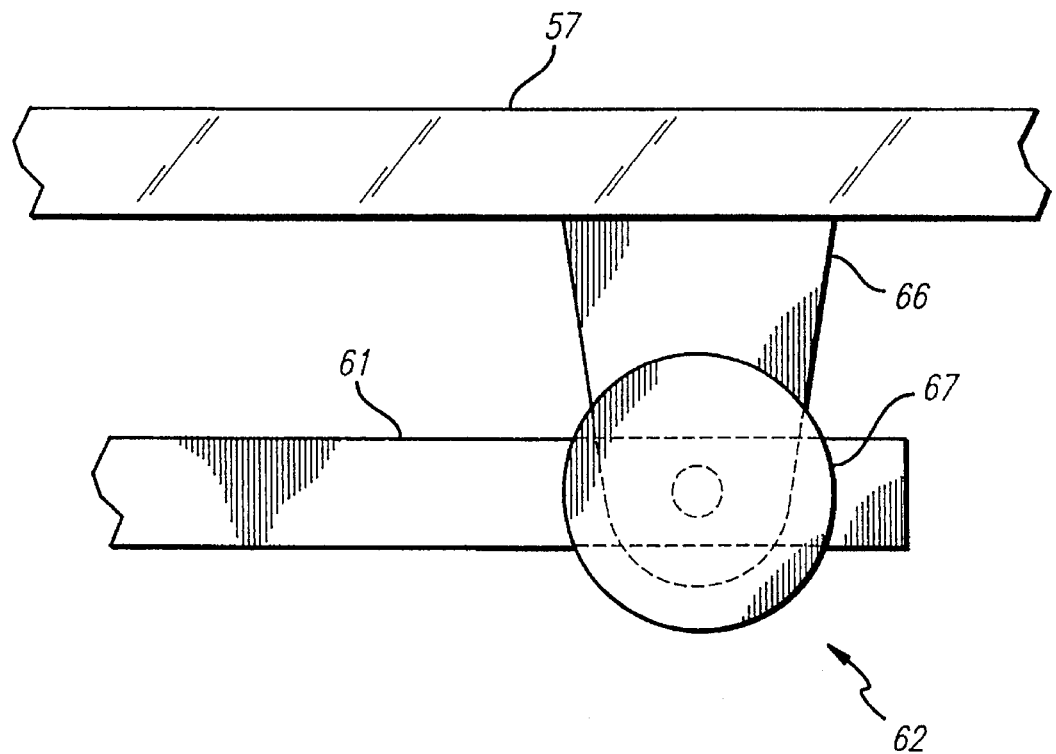
FIG. 5 is an enlarged partial blowup of a portion of FIG. 4 illustrating an exemplary mounting detail for the computer or game machine of FIG. 4.

In the context of the present invention, many different mounting arrangements are suitable for the computer display device 61. FIG. 5 is a front elevational view of one acceptable mounting arrangement with FIG. 6 being a side elevation of the arrangement. Basically, a mounting bracket or pair of mounting brackets 66 are provided descending downwardly from the bottom surface of tabletop 57 and having a friction screw or bolt 67 passing through an opening in the bracket 66 and screwed into an edge surface of the computer display device 61. By loosing the screw 67, computer display device 61 can be tilted or angled downwardly, with the screw 67 being again tightened to retain the device in virtually any desired position. Alternatively, a screw and friction washer arrangement can be used. Of course, many other arrangements are also suitable for mounting the computer display device to the bottom of a tabletop such that it can positioned for use by a player or operator seated at the edge of the tabletop and viewing the computer display device through the transparent tabletop. This could be piano hinge arrangements, hydraulic or pneumatic cylinders for holding the computer display device in whatever angled position it is placed in, cams with detents etc. Many such suitable arrangements are known in the art.

It should be clear that the aspects of the present invention enabling selective switching of an electronic game apparatus between a gaming mode and a strictly amusement mode, for respective use in jurisdictions where gaming is legal and for use for amusement purposes only where it is not legal, is particularly applicable to vehicles or vessels, such as boats, airplanes, trains and buses, that transport occupants through various geographic jurisdictions in their operation.

Figure 8:
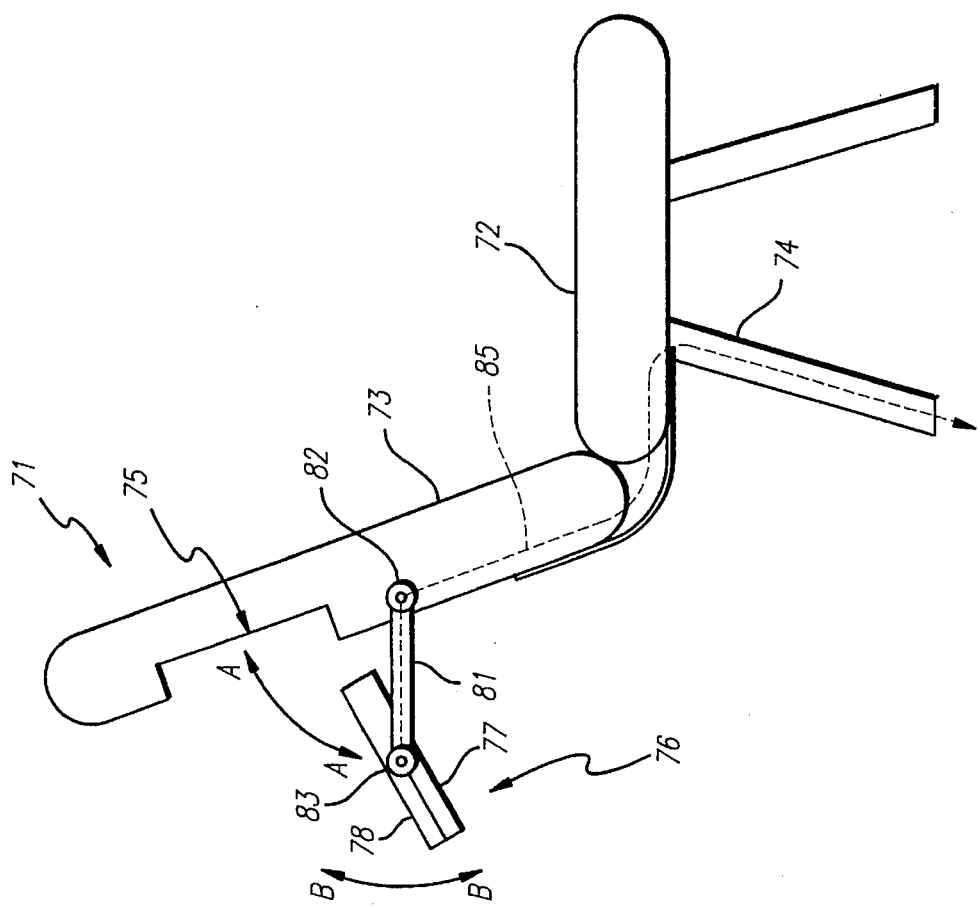
FIG. 8 is a side elevation similar to FIG. 7, showing the computer or game machine monitor and tray configuration in an operating or use condition.
Figure 7:
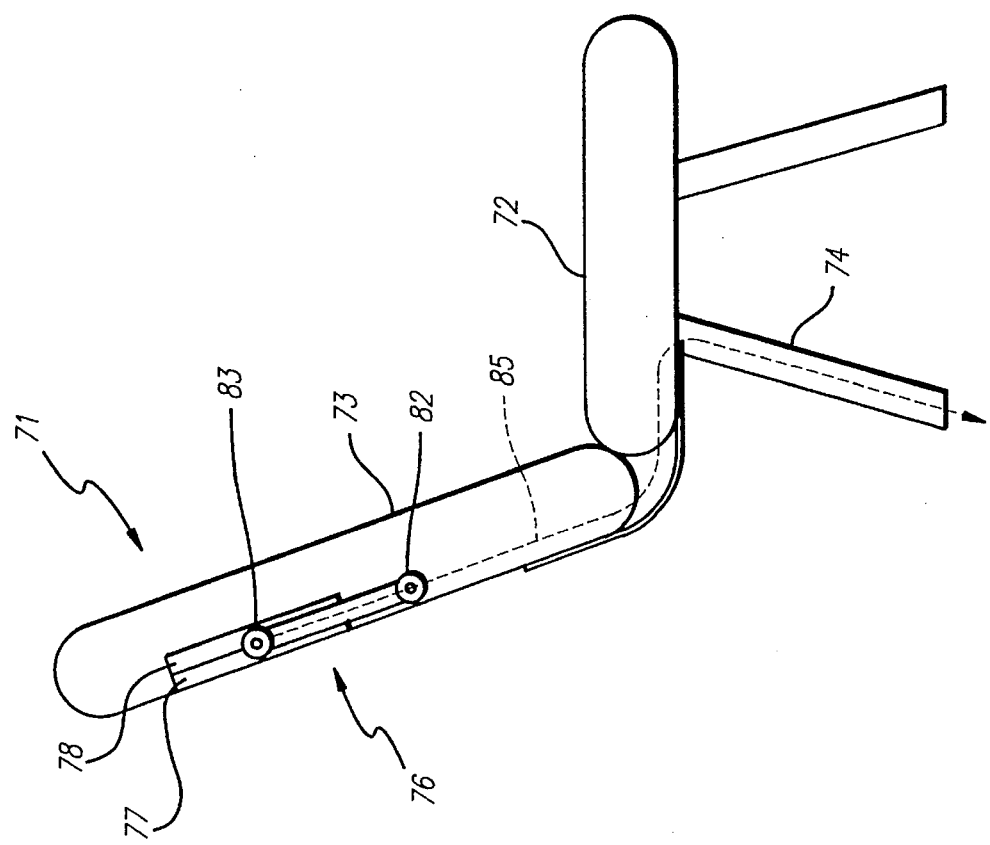
FIG. 7 is a side elevation of a typical seating and tray configuration for a vehicle such as an airplane or bus, showing incorporation of a computer or game machine monitor together with a tray configuration in accordance with one aspect of the present invention, shown in a storage condition.

FIGS. 7 and 8 illustrate still another aspect of the present invention in which a computer display device such as an LCD panel, with touch screen or the like for player input, is mounted in a convenient manner in a seating arrangement for a vehicle. Typically, vehicles such as airplanes or buses have a plurality of rows of seats, with one of the seats illustrated generally by reference numeral 71 in FIGS. 7 and 8. Space and weight are very important considerations, particularly on airplanes. Efforts so far to provide computers for passenger use on airplanes involved the use of a small liquid crystal display device for the computer monitor, usually mounted in the back of the airplane seats. Of course, often meal trays are also mounted in the back of airplane seats, and the computer monitor has to share space in the airplane seat back. The small screen is, of course, useful to minimize weight and space occupied, but severely limits the utility of the computer because of the small display area available and the inability to position the monitor to the passenger's preference. The small area that would result for a touch screen results in the usual provision of a separate input device for the user-the screen is just simply too small for providing touch screen capabilities.

FIGS. 7 and 8 illustrate providing a space efficient and relatively large size computer monitor with touch screen input in the back of passenger seats on vehicles such as airplanes in a manner that they can be adjusted in position in accordance with passenger preference. In the drawings, seat 71 has a seat portion 72, a back portion 73, and suitable legs or mountings 74 to fix the seat to the vehicle. In accordance with the invention, a cutout portion 75 is provided in seat back 73, the purpose of which is to receive and serve as a storage area for a tray/monitor assembly generally indicated by reference numeral 76. The tray/monitor assembly 76 is configured to have a thin panel computer monitor 77 preferably incorporating touch screen input means, combined back to back with a meal tray panel 78, as shown in the drawings. The meal tray panel 78 can be flat, or can be provided with one or more depressions for holding cups, etc. in place as known in the art. The computer monitor 77 and tray panel 78 can be held together in assembled relationship by any convenient means such as screws or the like (not shown), or could both be held in a thin frame or the like in assembled relationship (not shown).

Figure 6:
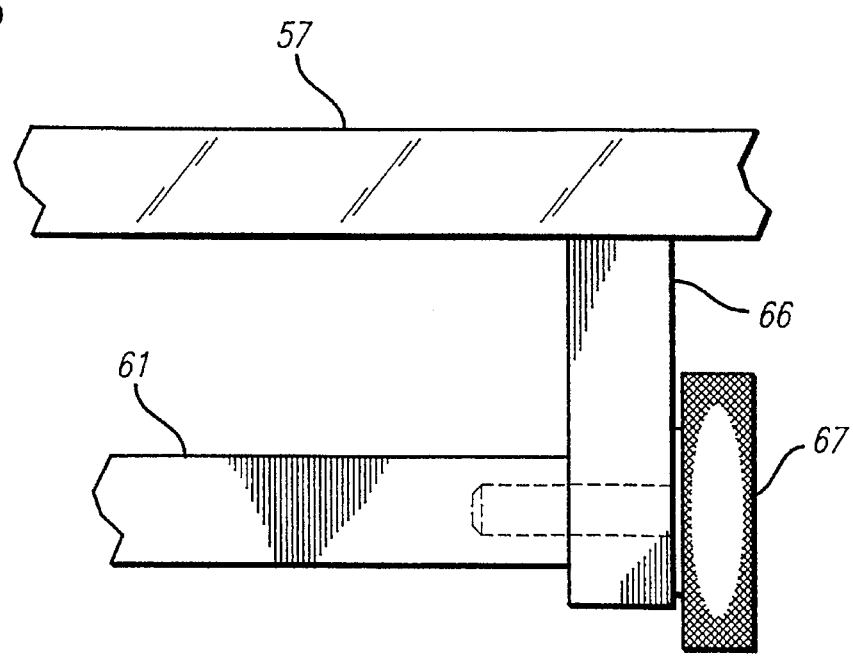
FIG. 6 is a side view of the mounting detail shown in FIG. 5.

The tray/monitor assembly 76 is mounted to seatback 73 by a pair of swing arms 81 mounted to either side of seatback 73 by an adjustable locking assembly 82, and mounted to the sides of tray/monitor assembly 76 by adjustable locking assembly 83. The adjustable locking assemblies 82 and 83 can be of any convenient and known configuration, and one suitable construction is the same friction locking knob assembly as illustrated in FIGS. 5 and 6 in connection with discussion of another aspect of this invention. Alternatively, the locking assemblies 82 and 83 can be known configurations of cams with detents, spring loaded pins which fit into recesses for locking, etc. Many suitable configurations are known to those in the art, and the particular configuration is not part of the essence of this invention. In any event, the purpose of adjustable locking assembly 82 is to permit the swing arms 81 and attached tray/monitor assembly 76 to pivot in the direction indicated by reference line A—A, from a storage position where it is located within cutout portion 75, to any desired position. FIG. 8 shows the swing arms 81 and tray/monitor assembly in a horizontal position, but it should be clear that the purpose is to be able to fix the swing arms 81 and attached tray/monitor assembly 76 in any desired intermediate position.

The adjustable locking assembly 83 can likewise be of any suitable configuration, as discussed above in connection with adjustable locking assemblies 82. The purpose of the adjustable locking assemblies 83 is to permit in the range of 180 degrees or more rotation of and locking in place of tray/monitor assembly 76, and preferably even a greater degree range of rotation, even 360 degrees. Reference line B—B in FIG. 8 is intended to be a representation of the permitted rotation of the tray/monitor assembly 76.

Through rotation and fixing of tray/monitor assembly 76, either the tray panel 78 or the computer monitor 77 can be positioned for use by the passenger, by rotation of the assembly 76 in its mountings 83 and fixing the locking assemblies 83 with assembly 76 in a desired position. Note that through adjustable locking assemblies 82 and 83, the tray/monitor assembly 76 can be positioned in a wide range of possible desired positions for use by a passenger.

As previously mentioned, the computer monitor 77 is preferably an LCD computer screen, or other substantially flat panel type computer screen, for reasons of space economy in combining same in a seat back with a tray panel. It is also preferred that the computer monitor 77 incorporate a touch screen for input to the computer by a passenger. Suitable power and communication connections can be made to the computer monitor 77 through wiring extending through swing arms 81, seat back 73, seat bottom 72, and legs or mountings 74, as indicated diagrammatically in FIGS. 7 and 8 by the dashed line labeled 85.

In the drawings the computer monitor 77 can be just a monitor and input device, connected for computing or communication purposes by wiring 85 to a computer or the like. Alternatively, the computer monitor 77 can be a complete computer or terminal, with power being supplied by wiring 85 or even by on-board batteries provided in the computer monitor 77.

The computer monitor 77 can serve a variety of purposes. In addition to placing at a passenger's disposal general purpose computing power if desired, the computer monitor 77 can be a gaming or amusement device, or serve as a communications input for transmitting faxes or the like. It can also be programmed in a known fashion and used by a passenger to order refreshments from attendants on the vehicle, or to order merchandise for delivery while on the vehicle or upon arrival at a destination, all through communications provided by wiring 85. An on-line or memory resident catalog can be provided for display on computer monitor 77 to facilitate such ordering and sales to passengers, in a manner already well known in the computer arts.

It should be clear from the foregoing description and drawings that the present invention has a variety of facets, usable in combination or subcombinations or individually, and it is intended by the claims appended hereto to cover all such uses.

I claim:

1. An electronic game machine system comprising a plurality of electronic game machines, switching means provided for each electronic game machine for selectively switching the electronic game machine between a first mode and a second mode, said electronic game machine having player input controls for player input or selection during the course of a game, said electronic game machine also including scoring circuitry for automatically keeping a game score when operated in the first mode, said electronic game machine system also including a separate register positioned at a central location or at a game machine for maintaining an account balance for a player when operating in said second mode, and circuitry for incrementing or decrementing the player account balance in said register in accordance with the outcome of play on an electronic game machine operated in said second mode, and a remote system controller connected to said plurality of game machines which is operable to remotely disable said second mode when desired.

2. An electronic game machine system in accordance with claim 1 wherein the remote system controller is operated by a person to remotely disable said second mode for all of said game machines when desired.

3. An electronic game machine system in accordance with claim 1 which is located on a vehicle suitable for travel to a variety of geographic locations, and which system includes a navigation receiver for determining present geographic position, a stored table of geographic positions corresponding to selected jurisdictions selected in accordance with desired criteria related to the gaming laws of those jurisdictions, and a position switch control for making a comparison between present geographic position against said stored table of geographic positions to determine if the present geographic position is within said selected jurisdictions, said position switch control automatically controlling said remote system controller to remotely disable said second mode automatically when said game machine system is located at a geographic position outside of geographic positions stored in said table.

4. An electronic game machine system in accordance with claim 1, wherein said player input controls comprise a touch screen.

5. An electronic game machine system in accordance with claim 1, wherein said system includes means operable when said game machine system is operating in said second mode for accepting player input of wagers or player selected increases to an account balance through at least one of credit card debits, tokens, or cash.

6. An electronic game machine system in accordance with claim 5 including means operable when said game machine system is operating in said second mode for vending to a player the player's account balance through at least one of credit card credits, tokens and cash.

7. An electronic game machine system in accordance with claim 1 including a visible and marked player operated input to scoring circuitry of the device system when the system is being operated in said first mode for increasing the player's score by selected arbitrary amounts at arbitrary times as selected by the player.

8. An electronic game machine system in accordance with claim 1, wherein each electronic game machine includes a communications component interconnected with said remote system controller for communications with same, whereby a player at one of the electronic game machines can place orders for items with said remote system controller.

9. A method of utilizing electronic game machines on vehicles which move to a variety of geographic locations, comprising the steps of providing a plurality of electronic game machines with a first mode of operation wherein the game machines provide a score indicative of player performance and a second mode of operation wherein the game machines increment or decrement a register positioned at a central location or at a game machine a player account in accordance with player performance, and providing a remote system controller connected to all the plurality of electronic game machines for remotely disabling the second mode of operation of all the game machines when desired.

10. The method of claim 9 including the step of controlling the switching means by a person operating the system controller connected to all the electronic game machines.

11. The method of claim 9 including the steps of automatically determining the present geographic position of the vehicle having the electronic game machines located thereon, automatically performing a comparison between the present geographic position with known geographic positions corresponding to geographic positions selected in accordance with desired criteria relating to the gaming laws of jurisdictions at those geographic positions, and automatically controlling with the system controller disabling of the second mode of operation in accordance with the comparison when the vehicle is outside of those known and selected geographic positions.

12. A method in accordance with claim 9 including the step of providing the electronic game machines with touch screens upon which buttons can be displayed for registering player input or selection by placing or sliding a finger on a desired button, and including the further steps of displaying a plurality of buttons on the screen, with each of the plurality of buttons having visually defined boundaries on the screen, defining an enlarged sensitive area for each button having a larger area than the visually defined boundary for that button, activating the enlarged sensitive area for a particular button when a finger touch which is still touching is sensed for that button and concurrently highlighting the visually defined boundary for that button, registering a button selection for a highlighted button when the finger touch is released anywhere within the enlarged sensitive area for that highlighted button, unhighlighting a highlighted button when a finger which is still touching exits the enlarged sensitive area of a button without being released, and, when finger touch is sensed from finger placement on or finger sliding on within the visually defined boundary for a different button with the previously highlighted button being unhighlighted, highlighting that different button when finger touch is sensed from finger placement on or finger sliding on within the visually defined boundary for that different button and concurrently activating the enlarged sensitive area for that different highlighted button.

13. An electronic amusement device system comprising an electronic game machine, said electronic game machine having player input controls for player input or selection during the course of a game, said electronic game machine also including scoring circuitry for automatically keeping a game score when operated by a player, said player input controls for said electronic game machine including a visible and marked control operable at arbitrary, player-selected times by a player, to directly increment the game score as indicated by the scoring circuitry in addition to whatever score is achieved by a player as a result of game play.

* * * * *